Patented May 18, 1926.

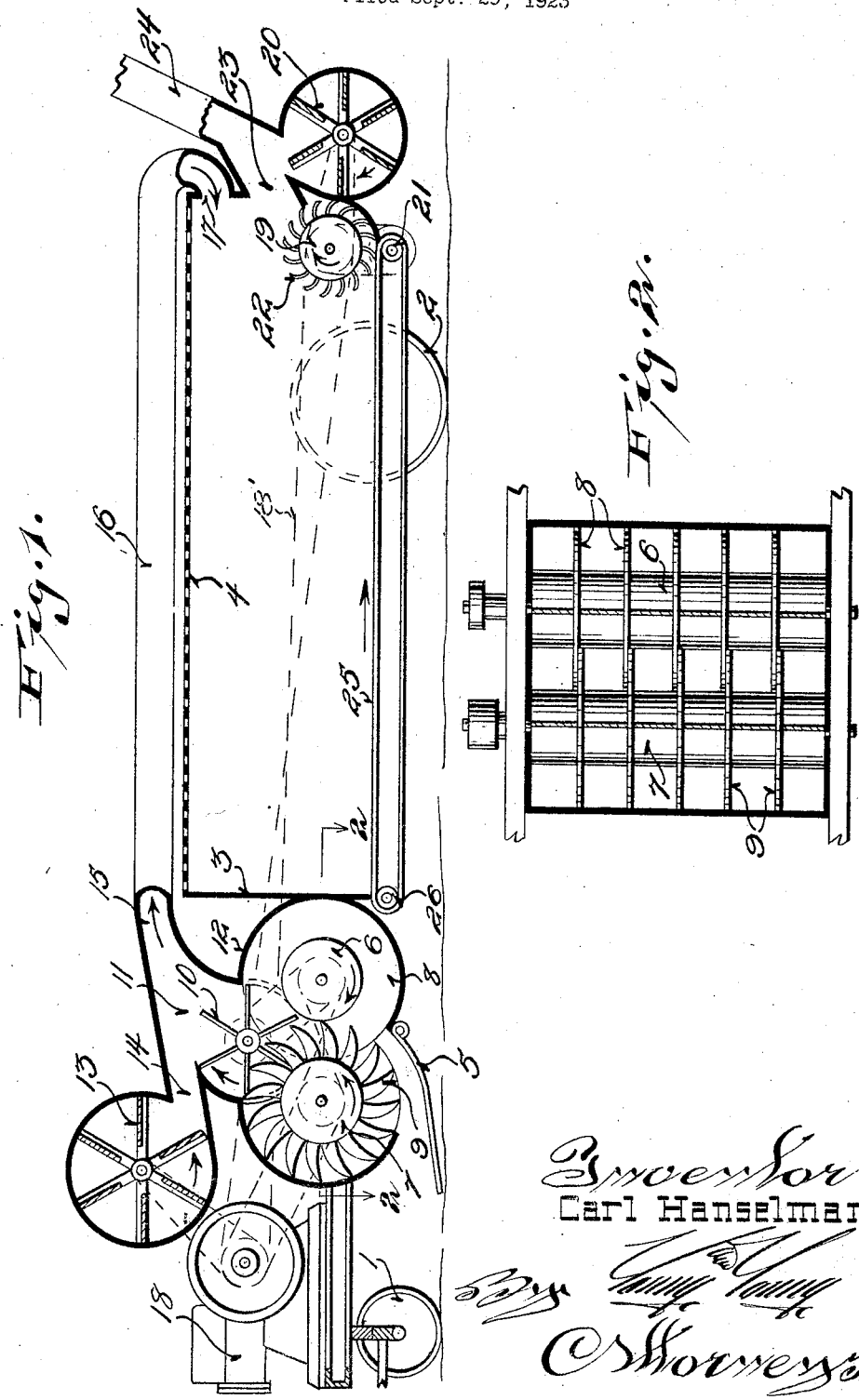

1,585,243

UNITED STATES PATENT OFFICE.

CARL HANSELMAN, OF EAU CLAIRE, WISCONSIN.

HAY HARVESTER.

Application filed September 29, 1923. Serial No. 665,599.

This invention relates to hay harvesters.

Objects of this invention are to provide a hay harvester which may be drawn across the field and which will gather the hay into a suitable receptacle, which will retain the hay and prevent packing which will cut the hay into relatively short lengths suitable for feed and storage and which is automatic in its operation.

Further objects are to provide a hay harvester which after being filled with hay, may be positioned adjacent a silo or other storage place, and which will deliver the cut hay into the silo without requiring auxiliary apparatus, which is so constructed that it will not allow the hay to pack in the machine, and which may be easily operated with a minimum of attention.

An embodiment of the invention is shown in the accompanying drawing, in which:—

Figure 1 is a diagrammatic sectional view taken longitudinally of the machine.

Figure 2 is a sectional view on the line 2—2 of Figure 1.

The machine comprises a frame work supported by front and rear wheels 1 and 2 respectively and having a receptacle or main body portion 3. This receptacle, it will be noted, is substantially rectangular in contour and is provided with an apertured upper portion 4.

Adjacent the forward end of the machine a hay rake or means for gathering the hay from the ground is illustrated at 5 and may comprise a hinged structure which is adapted to travel across the ground as the machine is drawn across the field by any suitable means. This hay rake delivers the hay to a pair of rotary cutters indicated at 6 and 7. The cutter 6 is substantially a drum provided with a plurality of circular blades 8 while the cutter 7 is also of drum-like formation and is provided with a plurality of arms 9 which may, if desired, also be sharpened and may act as cutters. These cutters rotate in reverse directions, as indicated in Figure 1, and cut and elevate the hay. If desired, a rapidly rotating elevator 10 may be provided which, by a plurality of radial arms, throws the hay upwardly into the neck 11 of a pneumatic system. This neck 11 is in effect a gradually contacted portion of the casing 12 surrounding the cutter, as may be seen from Figure 1. A blower 13 is provided with a short delivery pipe 14 which opens into the neck 11, and is directly aligned with the outgoing portion 15 thereof so as to direct a strong current of air through the neck and into the opening or mouth 15 of the delivery pipe 16. This, it will be seen, entrains the hay thrown upwardly into the neck 11 by the elevator 10 and causes such hay to be rapidly blown through the pipe 16 and into the compartment 3 through the delivery mouth 17 of such pipe.

It is to be noted that this delivered hay is shot longitudinally of the compartment closely adjacent the apertured top 4 and that the air and hay will travel just beneath such top, the air passing outwardly through the perforations. Any suitable means may be provided for driving the cutter, elevator and blower. For instance, a gasoline engine, illustrated at 18, may be employed and may be belted to the different devices as diagrammatically shown in Figure 1. The machine, as thus far described, is effective for picking the hay up, cutting it into lengths, separating it from the dirt and dust and storing it temporarily in the compartment 3.

When the compartment 3 is sufficiently filled, the machine is positioned adjacent a silo or other storage place, and a belt 18 is employed to connect the gasoline engine with a drum-like member 19 located adjacent the rear end of the compartment 3. This drum-like member is belted to a blower 20 and to a conveyor drum 21, as shown in Figure 1. It is provided with a plurality of radial arms 22 which elevates the hay and presents it adjacent the inlet mouth 23 of the blower system. This blower 20 projects a stream of air upwardly through the delivery pipe 24 and such upwardly passing stream rapidly carries the entrained hay upwardly into the desired storage device such for instance as a silo.

In order to act upon and deliver all of the hay contained in the compartment 3, a movable bottom is provided for such compartment and may take the form of a delivery belt or conveyor 25 which is carried upon the driving drum 21 adjacent the rear end of the machine and upon a forward drum 26. This belt travels in the direction illustrated in Figure 1 and gradually brings all of the hay into close proximity to the elevating rotary device 19.

It is to be understood that the second blower system or delivery mechanism is normally inactive while the machine is being drawn across the field and is gathering and cutting the hay. This part of the mechanism is used only when it is desired to deliver the hay from the container 3.

It will thus be seen that a hay harvester has been provided which will gather the hay from the ground, which will separate it from the dust, which will cut it into short lengths, and which may be operated to deliver the hay to a silo or other permanent storage place.

Although one form of the invention has been described in considerable detail, it is to be understood that the invention may be variously embodied and is, therefore, to be limited only as claimed.

I claim:

A hay harvesting machine adapted to be drawn across a field and comprising a plurality of supporting wheels, a body portion carried thereby and comprising an elongated receptacle for the cut hay, said receptacle being box like and having an elongated perforated top, a hay rake extending downwardly from adjacent the forward end of the machine, cutters for cutting and receiving hay delivered from said rake, a blower for blowing the cut hay and a conduit for receiving the cut hay from the blower, said conduit opening into the said container adjacent an upper edge and adapted to direct the blast of air and cut hay longitudinally along the under side of the perforated top, whereby an extensive sifting action takes place.

In testimony that I claim the foregoing I have hereunto set my hand at Eau Claire, in the county of Eau Claire and State of Wisconsin.

CARL HANSELMAN.